Patented Apr. 24, 1928.

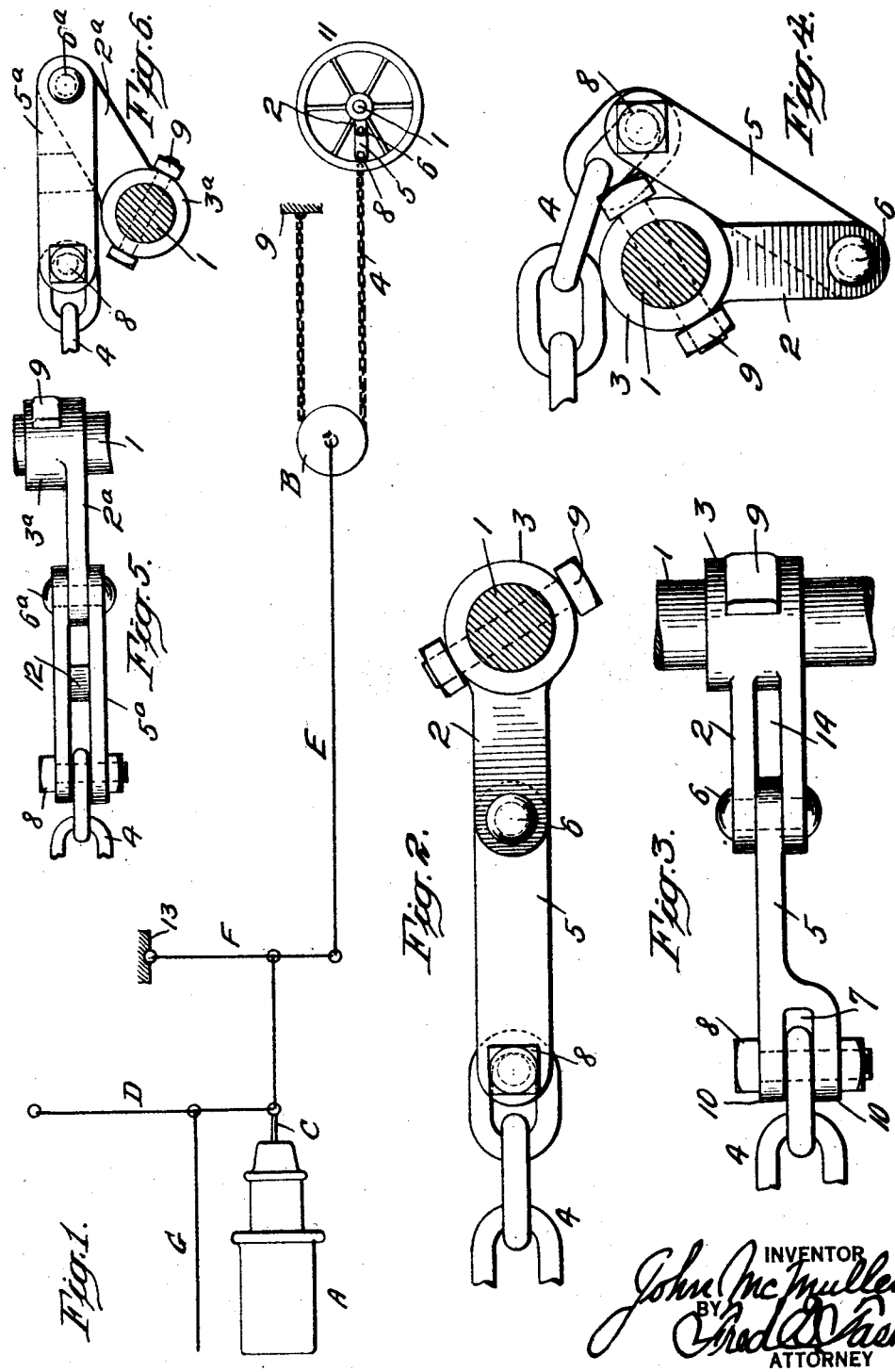

1,667,560

UNITED STATES PATENT OFFICE.

JOHN McMULLEN, OF BUFFALO, NEW YORK.

DEVICE FOR TAKING UP BRAKE CHAIN SLACK.

Application filed July 13, 1926. Serial No. 122,056.

My invention refers to a brake device for railway cars and other vehicles, and more particularly to a means for quickly taking up the slack in the chain which connects a manually-operated brake wheel or equivalent lever or other manual device with the leverage mechanism communicating motion to the shoes, the leading object among several that might be mentioned being to provide means for more speedily applying the hand brake appliances when they are required for use in emergency or other calls; and to this end taking up the slack in the chains or connections, so that the brake shoes may be instantly set by hand when there is no air, and so set with a power equal to a fluid pressure application. The invention therefore may be said to consist essentially in the construction, arrangement, and combination of parts, substantially as will be hereinafter described and claimed.

In the accompanying drawing illustrating my invention:

Figure 1 is a diagrammatic plan view of the essential features of a railway car brake equipment with my improved chain take-up devices applied thereto.

Figure 2 is an enlarged detail plan view of the chain take-up features for the slack in the chain.

Figure 3 is a side or edge view of the same.

Figure 4 is a cross-sectional plan view of the take-up members with the brake chain partly wound thereon and taking up the slack.

Figure 5 is a side or edge view, and Figure 6 a sectional plan view of an alternate form of the invention.

Like characters of reference designate like parts throughout all the figures of the drawing.

In Figure 1 I have shown a form of air brake mechanism in diagrammatic outline, together with a hand brake, so as to indicate how my improved slack take-up is arranged to function. In this view A denotes the brake cylinder on a car; C the brake cylinder piston rod; D the cylinder lever, from which runs the lever G for actuating the brake shoes which are not indicated; F an outline of leverage connected at 13 to the car, and having an actuating rod or lever E extending to the sheave or pulley B, around which passes the brake chain 4, one end of which is firmly attached at 9 to the car body, while the other end is usually attached to the brake post 1, which post carries the hand wheel 11, but in my improved device the chain 4 is not attached to the post 1 but is connected to the end of the take-up connection or member 5, or 5ª, which is pivoted to another arm, lever, or member 2, or 2ª, having a hub 3 secured to post 1 by a bolt 9, pin, or any other suitable means which passes through a hole in the post and proper coinciding holes in the hub. Of course it will be recognized that the mechanism of the air brake and the levers therefor and for the brake shoes is portrayed only diagrammatically, and all the detailed mechanism is not shown, as that would be unnecessary, as I only need to indicate the relation to such parts in a general way of the brake chain serving with the brake wheel and its post, so as to explain the novelty and value of my improved device.

The brake post 1 provided with its hand wheel 11 is supported in any customary or convenient part of a car or other conveyance, as for instance the platform of a passenger coach or the top of a freight car, and may have a pawl and ratchet and other suitable details which it is unnecessary to show here. Secured to the post 1 is an extended arm or lever which is susceptible of a wide diversity in its configuration, but which is formed with a sleeve or hub 3 through which the post 1 passes, the post 1 and hub 3 being securely fastened together by a bolt and nut, 9, pin or dowel passing through an opening in hub 3 and a coincident opening in staff 1. The arm which is integral with hub 3 may take the form shown at 2 in Figure 3, where it has a slot 14, and is pivoted by means of a rivet form of pivot 6 to a single connecting member 5, one end of which enters the slot 14, while the other end is slotted at 7 to receive one of the links of the chain 4 which is held pivotally therein by means of the bolt 8, or other device, passing through the jaws 10, 10, on opposite sides of the slot 7. Or, in the alternate form shown in Figures 5 and 6 the hub 3ª is made integral with a single arm or lever 2ª, while the connecting member 5ª consists of two parallel strips having between them a central spacing member 12, preferably with one inclined edge. The lever 2ª enters one end of the connecting member 5ª between its two parts and is pivoted there by means of the pivot 6ª, while at the other end of member 5ª a link of the chain 4 is held between the two parts of the member by bolt 8. Of course the lever on the hub and the connecting member may have any desired length and be constructed as pointed out or otherwise, in order to provide means for taking up a considerable quantity of slack in the chain.

When the hand brake is called upon for use the first turn of the wheel 11 and its staff 1 will produce an initial effect of taking up a goodly amount if not all of the slack in chain 4, for the lever 2 and connecting member 5, or the lever 2ª and connecting member 5ª, will be swung around from the straight out position in Figures 2 and 3 and Figure 5 into the closed position shown in Figures 4 and 6 where the slack in the chain is taken up before the chain begins to wind on the staff 1. By the old method without any intervening leverage it is evident that but a small amount of the chain would be wound on the first turn, and it might take several turns to eliminate the slack and therefore a much longer time to apply the brakes. When the slack is taken out of the chain the continued rotation of the wheel 11 and the staff 1 will cause the chain to wind around the shaft 1, but since the slack of the chain has been removed by the intervention of the arms, the further tightening of the chain will be done gradually and by the winding of the same upon a member of small diameter, which will increase the force with which the shoes are applied to the wheels. In this way the braking of a car or train by hand is as quick and strong as automatic power braking.

Having thus described my invention, what I claim as new and desire to secure by Letters Patent is:

In a brake device, the combination with a chain for transmitting motion to the brake shoes, of means for taking up the slack consisting of a lengthened connecting slotted link to which the chain is pivoted, and a slotted elongated lever arm pivoted to said link, said lever arm having a hub, and a post on which the said hub is secured, and means for rotating the post, in order that the lever and link may take up the slack in the chain quickly and the balance of the chain gradually so as to exert a strong braking effect.

In testimony whereof I hereunto affix my signature.

JOHN McMULLEN.